Oct. 1, 1935.  C. B. NELSON  2,015,812
TOASTER
Filed Aug. 8, 1934    2 Sheets-Sheet 1
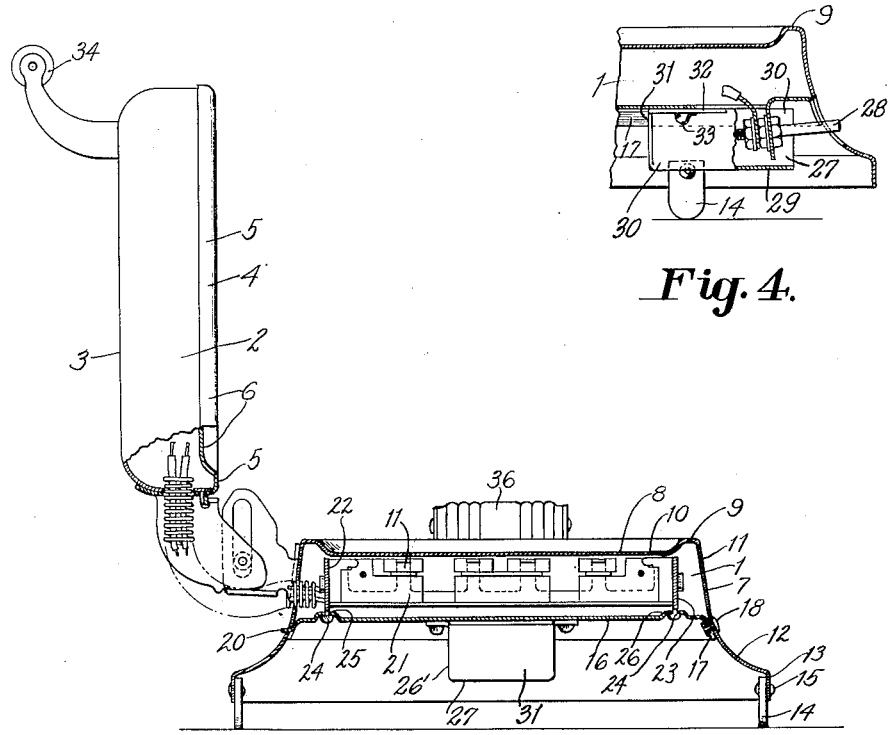
Fig. 4.
Fig. 2.
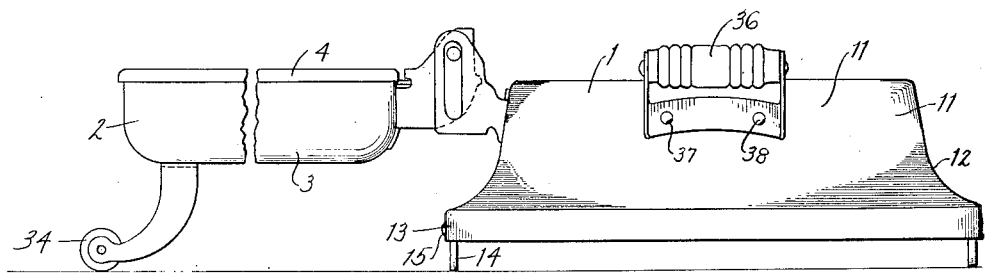
Fig. 1.
INVENTOR.
Christ B Nelson.
BY Slaughan Canfield
ATTORNEYs Oct. 1, 1935.  C. B. NELSON  2,015,812
TOASTER
Filed Aug. 8, 1934   2 Sheets-Sheet 2

INVENTOR.
Christ B. Nelson.
BY
ATTORNEYS.

Patented Oct. 1, 1935

2,015,812

UNITED STATES PATENT OFFICE 2,015,812

TOASTER

Christ B. Nelson, Cleveland, Ohio

Application August 8, 1934, Serial No. 738,993

6 Claims. (Cl. 53—5)

This invention relates to electrical appliances, particularly to electrical appliances for preparing food by toasting, grilling, and the like.

It is an object of the invention to provide generally an improved electric cooking appliance for preparing food by cooking, grilling, and the like.

Another object is to provide an electric cooking appliance of the class referred to having an improved housing construction for mounting and enclosing a heater unit.

Another object of my invention is to provide an electric cooking appliance of the class referred to having an improved unitary construction of housing for mounting and enclosing a heater unit, and hot plate for cooking purposes.

Another object is to provide an electric cooking appliance of the class referred to which will be exceedingly cheap to manufacture and assemble but durable and efficient in operation.

Other objects will be apparent to those skilled in the art to which my invention appertains.

My invention is fully disclosed in the following description taken in connection with the accompanying drawings, in which:

Fig. 1 is a side elevational view of an embodiment of my invention;

Fig. 2 is a view similar to Fig. 1, with parts in cross-section and with parts in different positions;

Fig. 4 is a fragmentary view taken from the plane 4—4 of Fig. 3.

Figure 3:
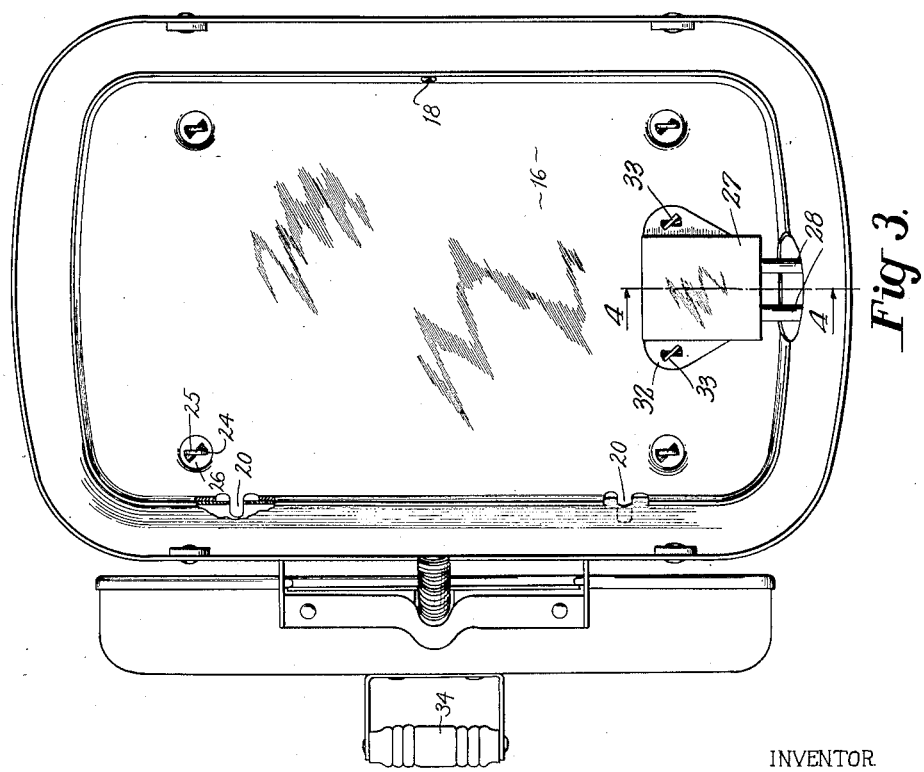
Fig. 3 is a bottom plan view of the embodiment of Figs. 1 and 2.

Referring to the drawings, in Fig. 1, I have designated generally by the characters 1 and 2, respectively, stationary and movable sheet metal housings enclosing separate electrical heating units. The movable sheet metal housing 2 comprises a pan-form element 3 and a cover 4. The cover 4 comprises an elevated rim portion 5 and a depressed shallow recess 6 constituting a hot plate cooking surface. The stationary housing 1 consists of a unitary sheet metal stamping 7 comprising a hot plate cooking surface portion 8 having an elevated rim portion 9 and a depressed shallow recess 10, similar to the rim and recess of the cover 4; and side and end wall portions 11 flaring outwardly in skirt portions 12, said skirt portions having a downwardly extending flange 13 to which a plurality of feet, 14, such as four, are secured and extend downwardly therefrom. The feet 14 are preferably fibrous stampings riveted to the flange 13, as indicated at 15. The stationary housing, therefore, may stand upon a table or the like and the fibre feet will prevent scratching or otherwise marring the table surface.

At 16 is a sheet metal base closing the downwardly open unitary stamping 7 at a point intermediate the flange 13 and plate 8. The base 16 has a downwardly outwardly flaring flange 17 conforming to the shape of the wall portion 11 and skirt portion 12; and at one side is supported and secured to the stamping by a pair of tongues 20—20 projected through perforations in the stamping and at the opposite side is secured by a rivet 18 projected through aligned perforations in the flange 17 and in the stamping.

A closed heater housing is thus provided between the base 16 and the plate portion 8 and side and end walls 11.

A heater, indicated generally at 21, is disposed in the heater housing. It may be of any suitable or known construction but preferably comprises sheet metal frame elements such as indicated at 22 and 23. One such heater element is described in my copending application Serial No. 738,992, filed Aug. 28, 1934, for improvements in toasters. Similar heaters may be provided in both housings 1 and 2.

The sheet metal frame elements 22 and 23 are disposed edgewise upon the base 16 and are provided with downwardly projected tongues 24—24 extending through perforations 25 in the base and twisted at portions beyond the perforations to secure the frame elements to the base.

The perforations 25 may be made in upwardly pressed bosses 26 whereby the frame elements and heater may be supported above the base 16.

As will now be apparent, by means of only two pieces of cut and pressed sheet metal, I provide a hot plate cooking portion 8, a heater housing and heater support 8—11—16 and a supporting base 16 and the equivalent of legs, 11—12—13; all admitting of flaring line contour and pleasing appearance as well as entailing the minimum of cost in production and assembling.

At 26' I indicate generally a sheet metal box 27 inclosing terminal plugs 28. Said box comprises a bottom 29, sides 30, and an end wall 31, the sides 30—30 having outwardly laterally extending wings 32. Tongues 33—33 are cut and bent downwardly out of the bottom of the base 16 and are projected through suitable perforations in the wings 32—32 and thereafter twisted, as by a pair of pliers, out of the plane of the tongues, thereby clamping the wings 32—32 on the base cover to secure the box 27 on the cover in position to enclose the plugs 28. An apron 39, pressed downwardly out of the base 16, supports the plugs 28 by suitable insulation in a well known manner.

The movable housing 2 is connected to the stationary housing 1 by a hinge construction whereby it may be disposed generally vertically and laterally of the housing 1, or may be rocked into a generally parallel position with the stationary housing at a variable height thereabove, or may be rocked outwardly downwardly to a horizontal position and supported above the table or the like supporting the housing 1.

A handle 34, secured to the movable housing 2 is preferably of such height and in such position that when the housing 2 to which it is secured is rocked to a spaced horizontal position with relation to the stationary housing 1, the handle will act as a rest for said element. The handle is preferably of such construction that it will not mar or chip the table upon which it rests.

The stationary housing 1 is preferably provided with a pair of handles 36 disposed on either side of the same and secured to the side portions 11 of said housing by means of rivets 37, and 38, and are used when it is desired to move the entire cooking appliance to another position.

In operation, the movable housing is placed in the position shown in Fig. 2 and food such as toast or the like to be toasted or grilled may be placed in the recess on the pan cover 8 and the housing 2 may be rotated over and may rest by gravity, due to the hinge construction, upon the upper side of the food. The heat generated within the two housings by the electrical heating units disposed therein and connected by means of the plugs to a suitable source of current, will toast or otherwise cook the food between the pan covers 8 and 6. After the cooking is completed, the movable housing 2 may be moved back to the position of Fig. 4, and the food removed.

If desired, both the housings may be first placed into the spaced horizontal position described supra, and food placed on both pan covers and cooked separately thereon.

My invention is not limited to the exact details of construction shown and described. Changes and modifications may be made within the spirit of my invention without sacrificing its advantages and without departing from the scope of the appended claims.

I claim:

1. In an electric cooking appliance, a one-piece pressed sheet metal housing element comprising a hot plate portion on which food may be cooked, peripherally continuous side wall portions depending therefrom and integral therewith and continuing downwardly in peripherally continuous supporting wall portions integral therewith, a transverse partition in the housing element spaced from the hot plate portion comprising a sheet metal stamping peripherally supported on the inner wall of the said depending side wall portions and an electric heating unit housed in the space between the partition, the hot plate portion and the said side wall portions and the partition being provided with a plurality of bosses pressed in the metal thereof and the electric heating unit comprising frame elements resting upon the said bosses.

2. An electric cooking appliance as described in claim 1 and in which the said frame elements of the electric heating unit are secured to the partition.

3. In an electric cooking appliance, a one-piece pressed sheet metal housing element comprising a hot plate portion on which food may be cooked, peripherally continuous side wall portions depending therefrom and integral therewith and continuing downwardly in peripherally continuous supporting wall portions integral therewith, a transverse partition in the housing element spaced from the hot plate portion comprising a sheet metal stamping peripherally supported on the inner wall of the said depending side wall portions, the partition being provided with a plurality of bosses pressed in the metal thereof, and an electric heating unit housed in the space between the partition, the hot plate portion, and the said side wall portions, the electric heating unit comprising frame elements of sheet metal resting upon the said bosses and secured to the partition by connecting elements extending from the frame elements through the boss perforations and bent therebeyond.

4. In an electric cooking appliance, a one-piece pressed sheet metal housing element comprising a hot plate portion on which food may be cooked, peripherally continuous side wall portions depending therefrom and integral therewith and continuing downwardly in peripherally continuous supporting wall portions integral therewith, a transverse partition in the housing element spaced from the hot plate portion comprising a sheet metal stamping peripherally supported on the inner wall of the said depending side wall portions, the partition being provided with a plurality of bosses pressed in the sheet metal thereof, and an electric heating unit housed in the space between the partition, the hot plate portion, and the said side wall portions, the heating unit comprising frame elements of sheet metal resting upon said bosses and secured to the partition by tongues on the frame elements projected through the perforations in the bosses and twisted therebeyond.

5. In an electric cooking apparatus, a generally bell-formed one-piece pressed sheet metal housing element comprising a generally horizontal recessed hot plate portion on which food may be cooked, side wall portions depending therefrom and continuing downwardly in outwardly flaring supporting wall portions, the latter terminating downwardly in a vertical flange, non-abrasive feet secured to the flange, a transverse partition in the housing element spaced from the hot plate portion comprising a one-piece sheet metal stamping having a peripheral flange substantially fitting and supported upon the inner wall surfaces of the housing element on portions of the depending side wall portions thereof and secured thereto by a tongue on the partition and projected into a perforation in the side wall portion at one side of the housing element and on the opposite side thereof by an element projected through the side wall portion and through the flange of the partition, a plurality of bosses pressed upwardly from the partition and elongated perforations in the bosses, and an electric heating unit housed in the space between the partition, the hot plate portion and the side wall portions comprising sheet metal frame elements supported on the said bosses and having tongues projected through the boss perforations and twisted therebeyond.

6. In an electric cooking apparatus, a generally bell-form one-piece pressed sheet metal housing element comprising a generally horizontal recessed hot plate portion on which food may be cooked, peripherally continuous side wall portions depending therefrom and integral therewith and continuing downwardly in outwardly flaring peripherally continuous supporting wall portions integral therewith, the latter terminating downwardly in a vertical flange, a transverse partition in the housing element spaced from the hot plate portion comprising a sheet metal stamping having a portion supported on the depending side wall portions thereof and secured thereto, a plurality of bosses pressed upwardly from the partition, and an electric heating unit housed in the space between the partition, the hot plate portion and side wall portions comprising frame elements supported on the said bosses and secured thereto.

CHRIST B. NELSON.